(12) United States Patent
Cannaday, Jr.

(10) Patent No.: US 6,614,383 B1
(45) Date of Patent: Sep. 2, 2003

(54) BEAM WIDTH DISPLAY METHOD AND SYSTEM

(75) Inventor: Theodore H. Cannaday, Jr., Staley, NC (US)

(73) Assignee: Avidyne Corporation, Lincoln, MA (US)

( * ) Notice: Subject to any disclaimer, the term of this patent is extended or adjusted under 35 U.S.C. 154(b) by 0 days.

(21) Appl. No.: 10/116,671

(22) Filed: Apr. 3, 2002

Related U.S. Application Data

(60) Provisional application No. 60/281,089, filed on Apr. 3, 2001.

(51) Int. Cl.[7] .............................................. G01S 13/95
(52) U.S. Cl. ............................. 342/26; 342/74; 342/81; 342/120; 342/146; 342/179; 342/180; 342/181
(58) Field of Search .............................. 342/26, 74, 75, 342/81, 85, 118, 120, 121, 123, 146, 157, 158, 176, 179, 180, 181, 182, 195, 197

(56) References Cited

U.S. PATENT DOCUMENTS

| | | | | |
|---|---|---|---|---|
| 5,175,551 A | * | 12/1992 | Rubin | 342/26 |
| 5,262,782 A | * | 11/1993 | Rubin et al. | 342/26 |
| 5,392,048 A | * | 2/1995 | Michie | 342/26 |
| 5,440,483 A | * | 8/1995 | Badoche-Jacquet et al. | 702/3 |
| 5,920,276 A | * | 7/1999 | Frederick | 342/26 |
| 6,480,142 B1 | * | 11/2002 | Rubin | 342/26 |
| 2003/0001770 A1 | * | 1/2003 | Cornell et al. | 342/26 |
| 2003/0016115 A1 | * | 1/2003 | Szeto et al. | 342/26 |
| 2003/0016156 A1 | * | 1/2003 | Szeto et al. | 342/26 |

* cited by examiner

Primary Examiner—John B. Sotomayor
(74) Attorney, Agent, or Firm—Hamilton, Brook, Smith & Reynolds, P.C.

(57) ABSTRACT

A weather radar display system displays a beam indicator indicative of a radar beam. The beam indicator represents width of the radar beam as a function of range (distance from the radar beam source). The beam indicator allows a pilot to easily discern accuracy of detected weather conditions based on the beam width.

28 Claims, 3 Drawing Sheets

BEAM WIDTH DISPLAY METHOD AND SYSTEM

RELATED APPLICATION

This application claims the benefit of U.S. Provisional Application No. 60/281,089, filed on Apr. 3, 2001. The entire teachings of the above application is incorporated herein by reference.

BACKGROUND OF THE INVENTION

A weather radar system measures rainfall intensity within a scanned area. Intense rainfall may include severe turbulence which can be hazardous to aircraft flight. The weather radar system includes an antenna receiver/transmitter unit. The unit emits a concentrated beam of microwave energy. The returned echo indicates the intensity of detected targets. The detected intensity is displayed as color coded targets depicting echos on a display. The intensity of the rainfall at a given location is indicated by the color displayed. For example, black represents very light or no precipitation, green represents light precipitation, yellow represents moderate precipitation, red represents heavy precipitation and magenta represents very heavy precipitation.

A radar beam increases in width with increased distance from the sensor. At a large distance the beam is very wide, sometimes on the order of tens of miles. The radar sensor detects a target at a particular distance based on the average intensity of the echo across the full beam width. FIG. 1 illustrates a radar beam 100 transmitted from an airborne weather radar 102. As shown, the width (w) of the beam 100 increases with distance (d) from the airborne radar 102.

A typical thunderstorm is only one mile in diameter. Thus, a storm detected within a beam that is 10 miles wide may only return an echo indicating one-tenth the intensity because of intensity averaging over the full beam width. Thus, the intensity is incorrectly represented as green instead of showing regions of red. The returned echo is misleading because it does not depict the real intensity of the weather ahead.

SUMMARY OF THE INVENTION

A weather radar display system displays a beam indicator indicative of a radar beam. A beam dimension routine in the weather radar display system computes dimensions of the beam indicator. A display in the weather radar display system shows a weather target found by a radar signal of the radar beam. The beam indicator sweeps over the displayed weather target. The width of the beam indicator is relative to the width of the weather target providing an indication of the reliability of the displayed weather target.

The displayed beam indicator is opaque and provides an indication that the radar signal is being transmitted and received. The beam dimension routine computes the dimensions of the beam indicator to be displayed dependent on the beam width of an airborne radar antenna which transmits and receives the radar signal.

The angle of the beam indicator to be displayed decreases as the diameter of the antenna is increased. The beam indicator follows the center of an airborne radar sweep. The width of the beam indicator is dependent on distance from the source of the radar signal. The dimensions of the beam indicator remain constant as the scale of the display is modified. The beam indicator is wedge-shaped.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 2:
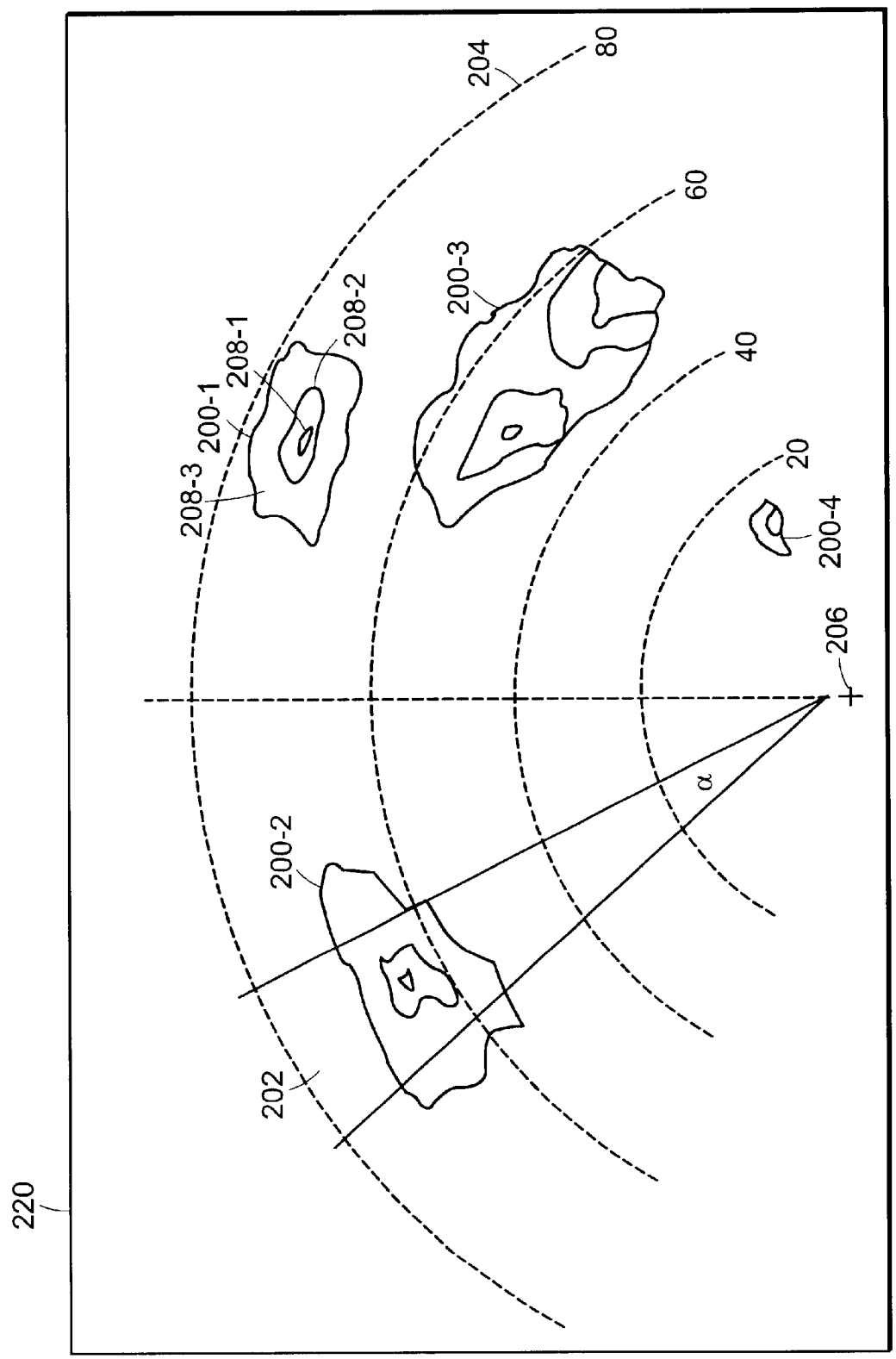
FIG. 2 is a graphical depiction of targets detected by an airborne weather radar including a beam width indicator indicative of a radar beam according to the principles of the present invention.

FIG. 2 is a graphical depiction of targets 200-1, . . . 200-4 detected by an airborne weather radar including a beam width indicator 202 indicative of a radar beam according to the principles of the present invention. A plurality of range rings 204 displayed on the display 220 indicate distance from the airborne weather radar mounted on the aircraft. In the embodiment shown, four range rings represent 20, 40, 60 and 80 Nautical Miles (NM) from the airborne weather radar. However, the invention is not limited to the range intervals shown. The number of range rings displayed is dependent on the installed airborne weather radar system and the maximum range selected to be displayed. For example, Bendix King's RT-1301 A/B can display range values 10, 20, 40, 80, 160 and 240 nautical miles and Collins' WXT-250A can display range values 10, 25, 50, 100 and 250 nautical miles. The detected targets 200 are displayed on the display screen 220. Each target can include a plurality of regions dependent on detected intensity within the target. For example, target 200-1 includes three intensity regions 208-1, 208-2 and 208-3. The displayed color of each region is dependent on the detected intensity.

A graphical depiction of radar beam width is displayed as a wedge-shaped or pie-shaped beam width indicator 202 on the display 220. The beam width indicator 202 sweeps over the displayed target 200 following the sweep of the radar antenna. The beam width indicator-202 is opaque and is drawn in the normal sweep area, underneath the detected targets 200-1, . . . 200-4. The width of the beam indicator 202 increases with distance from the source of the radar signal. However, the size of the beam indicator remains constant as the scale of the display is modified.

The radar beam width is dependent on the diameter and type (parabolic or phased array (or flat-plate) of the installed antenna. The beam width indicator 202 represents the actual width of the radar beam at various distance ranges. The beam width provided in radar sensor and antenna documentation for the installed antenna is used to determine the width of the beam indicator. The width of the installed antenna is stored in memory in the weather radar display system and the representative beam indicator to be displayed is selected dependent on the stored width. The width of the radar beam decreases as the diameter of the installed antenna increases. Representative beam widths based on antenna diameter are shown in Table 1 below.

TABLE 1

| Antenna Diameter | Generic Beam Width |
|---|---|
| 10" | 10° |
| 12" | 8° |
| 18" | 5° |
| 24" | 4° |
| 28" | 3.5° |
| 30" | 3° |

The beam indicator 202 on the display 220 represents the actual radar beam width at various distances from the radar sensor. The displayed relationship between the width of the beam indicator 202 and the target reinforces to a pilot that echoes depicted by targets 200-1, . . . 200-4 at large distances are highly inaccurate and should not be relied on for safe navigation.

The beam indicator 202 is displayed only when the airborne radar is operating. As a side benefit, the beam indicator 202 reminds the pilot that the radar sensor is operating. This information is useful during the busy after-landing segment of the flight where it is important to safely turn the radar OFF before approaching the line personnel or fuel facilities.

The beam indicator 202 is displayed within the sweep pattern of the radar depiction, centered on the depicted location of the aircraft 206 increasing in width to the outer edge of the depicted distance range. The display of the beam indicator 202 can be turned on or off through the use of a selectable menu item on a user interface displayed on the display.

Figure 1:
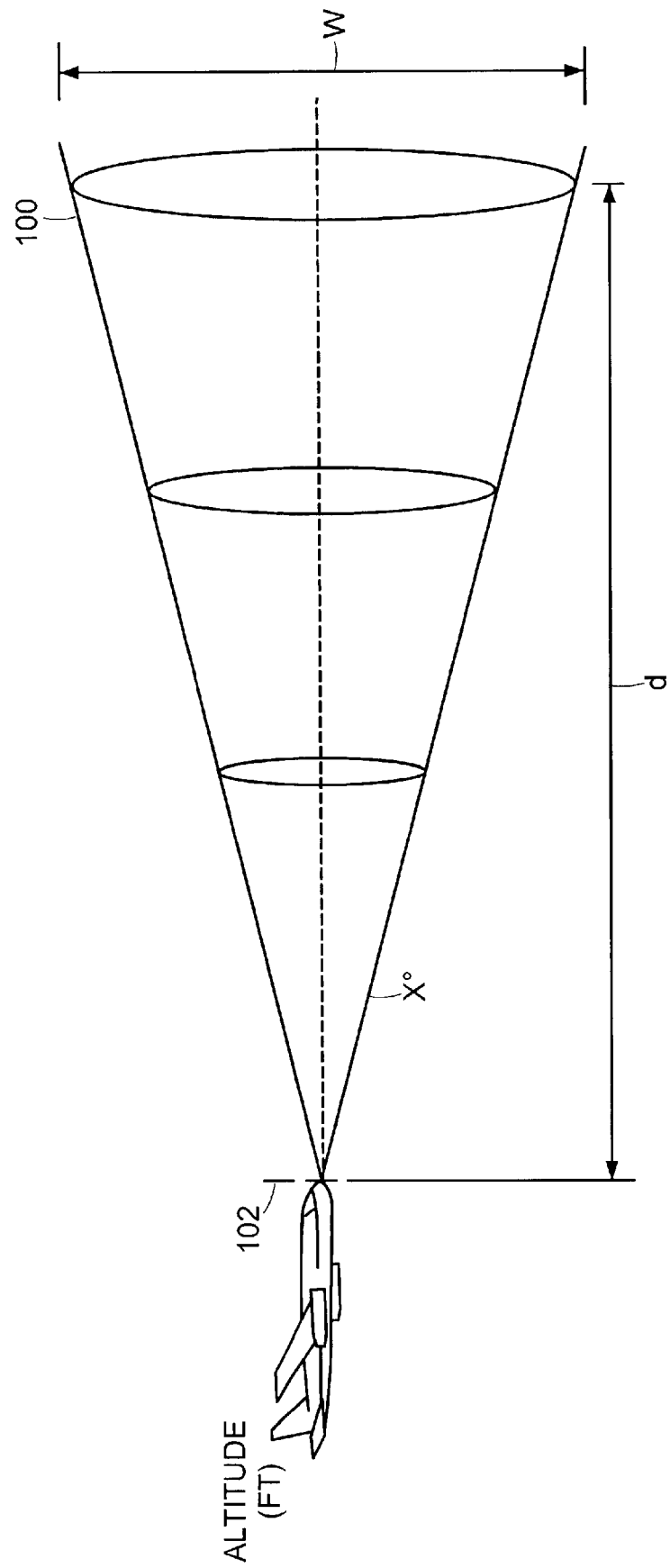
FIG. 1 illustrates a radar beam transmitted from an airborne radar.
Figure 3:
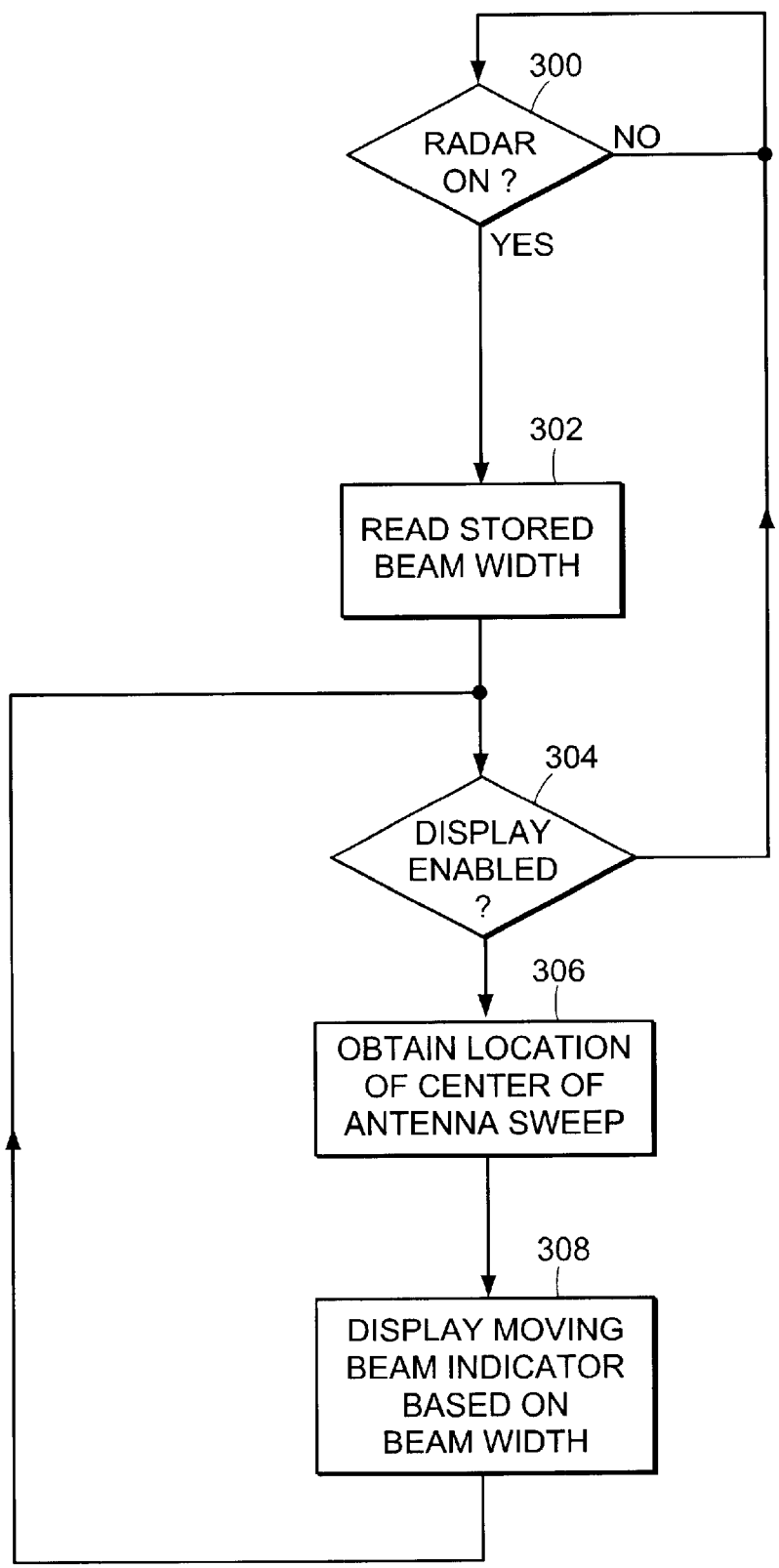
FIG. 3 is a flowchart illustrating the steps implemented in a beam dimension routine for computing the dimensions of the beam indicator indicative of a radar beam shown in FIG. 1.

FIG. 3 is a flowchart illustrating the steps implemented in a beam dimension routine stored in memory of the weather radar display system for computing the dimensions of a beam indicator indicative of a radar beam shown in FIGS. 1 and 2.

At step 300, the beam dimension routine checks if the radar is on. The beam display indicator is displayed, only if radar is operating. Thus, if radar is off no further processing is required by the beam dimension routine.

At step 302, the beam dimension routine reads the stored beam width for the installed antenna. The beam width is a fixed value based on the diameter of the antenna and is stored in memory in the display system. Processing continues with step 304.

At step 304, the beam dimension routine reads display enable status stored in memory to determine if the display of the beam indicator is enabled. The state of the display enable status parameter can be selected through a selectable menu item on a user interface by the user of the display. If the display is enabled, processing continues with step 306. If not, the beam indicator is not displayed and processing continues with step 300.

At step 306, the beam dimension routine determines the location of the center of the antenna sweep. The beam indicator is displayed moving across the display with the center of the antenna sweep. Processing continues with step 308.

At step 308, the beam dimension routine displays the beam indicator 202, based on the stored beam width for the installed antenna, moving across the display with the antenna sweep. In one embodiment, the dimensions of the beam indicator are computed once based on the stored diameter of the installed antenna for each distance range displayed.

Beam width at a particular distance from the antenna is computed using the following algorithm:

$$\text{Width} = \sin(deg) * \text{distance}/\sin((180-deg)/2) * 6076$$

where: deg=Beam width in degrees
distance=distance (in nm) from aircraft at which the measurement occurs 6076 is a constant (feet per nm)

Beam width for representative antenna diameters at different distances from the radar source are shown in Table 2 below:

TABLE 2

| Generic Beam Width | Width (feet) at 20 nm | Width (feet) at 40 nm | Width (feet) at 60 nm | Width (feet) at 80 nm |
|---|---|---|---|---|
| 10° | 21,182 | 42,364 | 63,547 | 84,729 |
| 8° | 16,954 | 33,907 | 50,860 | 67,814 |
| 5° | 10,601 | 21,203 | 31,804 | 42,405 |
| 4° | 8,482 | 16,964 | 25,492 | 33,928 |
| 3° | 6,362 | 12,724 | 19,086 | 25,448 |

For purposes of display 220, the dimensions of the beam indicator 202 are determined from the calculated beam width. The end points of the polygon to be drawn on the display are determined based on the beam width. Once the end points are determined, the polygon is filled in using a standard polygon fill technique. The beam indicator is displayed on the display within the sweep of the radar beam as long as the display of the indicator beam is enabled and the radar is operating.

While this invention has been particularly shown and described with references to preferred embodiments thereof, it will be understood by those skilled in the art that various changes in form and details may be made therein without departing from the scope of the invention encompassed by the appended claims.

What is claimed is:

1. A weather radar display system comprising:
   a beam dimension routine which computes dimensions of a beam indicator to be displayed, the beam indicator indicative of a radar beam; and
   a display which shows a weather target found by a radar signal of the radar beam, the beam indicator sweeping over the displayed weather target, the width of the beam indicator relative to the width of the weather target providing an indication of the reliability of the displayed weather target.

2. The weather radar display system as claimed in claim 1 wherein the displayed sweeping beam indicator is opaque.

3. The weather radar display system as claimed in claim 1 wherein the displayed beam indicator provides an indication that the radar signal is being transmitted and received.

4. The weather radar display system as claimed in claim 1 wherein the beam dimension routine computes the dimensions of the beam indicator to be displayed dependent on the beam width of an airborne radar antenna which transmits and receives the radar signal.

5. The weather radar display system as claimed in claim 4 wherein the angle of the beam indicator to be displayed decreases as the diameter of the antenna is increased.

6. The weather display system as claimed in claim 4 wherein the beam indicator follows the center of an airborne radar antenna sweep.

7. The weather radar display system as claimed in claim 1 wherein the width of the beam indicator is dependent on distance from the source of the radar signal.

8. The weather display system as claimed in claim 1 wherein the dimensions of the beam indicator remain constant as the scale of the display is modified.

9. The weather display system as claimed in claim 1 wherein the beam indicator is depicted in dark grey on the display.

10. The weather radar display system as claimed in claim 1 wherein the displayed sweeping beam indicator is opaque.

11. A radar display system comprising:

a beam dimension routine which computes dimensions of a beam indicator to be displayed, the beam indicator indicative of a radar beam; and a display which shows a target found by a radar signal of the radar beam, the beam indicator sweeping over the displayed target, the width of the beam indicator relative to the width of the target providing an indication of the reliability of the displayed target.

12. A method for representing reliability of displayed information in a weather radar display system comprising the steps of:

computing dimensions of a beam indicator to be displayed, the beam indicator indicative of a radar beam; and displaying a weather target found by a radar signal of the radar beam; and sweeping the beam indicator over the displayed weather target, the width of the beam indicator relative to the width of the weather target providing an indication of the reliability of the displayed weather target.

13. The method as claimed in claim 12 wherein the displayed beam indicator provides an indication that the radar signal is being transmitted and received.

14. The method as claimed in claim 12 wherein the beam dimension routine computes the dimensions of the beam indicator to be displayed dependent on the beam width of an airborne radar antenna which transmits and receives the radar signal.

15. The method as claimed in claim 14 wherein the angle of the beam indicator to be displayed decreases as the diameter of the antenna is increased.

16. The method as claimed in claim 14 wherein the beam indicator follows the center of an airborne radar antenna sweep.

17. The method as claimed in claim 12 wherein the width of the beam indicator is dependent on distance from the source of the radar signal.

18. The method as claimed in claim 12 wherein the dimensions of the beam indicator remain constant as the scale of the display is modified.

19. The method as claimed in claim 10 wherein the beam indicator is wedge-shaped.

20. A weather display system comprising:

beam dimension means which computes dimensions of a beam indicator to be displayed, the beam indicator indicative of a radar beam; and a display which shows a weather target found by a radar signal of the radar beam, the beam indicator sweeping over the displayed weather target, the width of the beam indicator relative to the width of the weather target providing an indication of the reliability of the displayed weather target.

21. The weather radar display system as claimed in claim 20 wherein the displayed sweeping beam indicator is opaque.

22. The weather radar display system as claimed in claim 20 wherein the displayed beam indicator provides an indication that the radar signal is being transmitted and received.

23. The weather radar display system as claimed in claim 20 wherein the beam dimension means computes the dimensions of the beam indicator to be displayed dependent on the beam width of an airborne radar antenna which transmits and receives the radar signal.

24. The weather radar display system as claimed in claim 23 wherein the angle of the beam indicator to be displayed decreases as the diameter of the antenna is increased.

25. The weather display system as claimed in claim 23 wherein the beam indicator follows the center of an airborne radar antenna sweep.

26. The weather radar display system as claimed in claim 20 wherein the width of the beam indicator is dependent on distance from the source of the radar signal.

27. The weather display system as claimed in claim 20 wherein the dimensions of the beam indicator remain constant as the scale of the display is modified.

28. The weather display system as claimed in claim 20 wherein the beam indicator is wedge-shaped.

* * * * *